Oct. 18, 1955   E. P. HARRIS   2,720,685
SEALING STRIP
Filed Aug. 26, 1954   2 Sheets-Sheet 1

INVENTOR
EDWARD P. HARRIS
BY
ATTORNEY

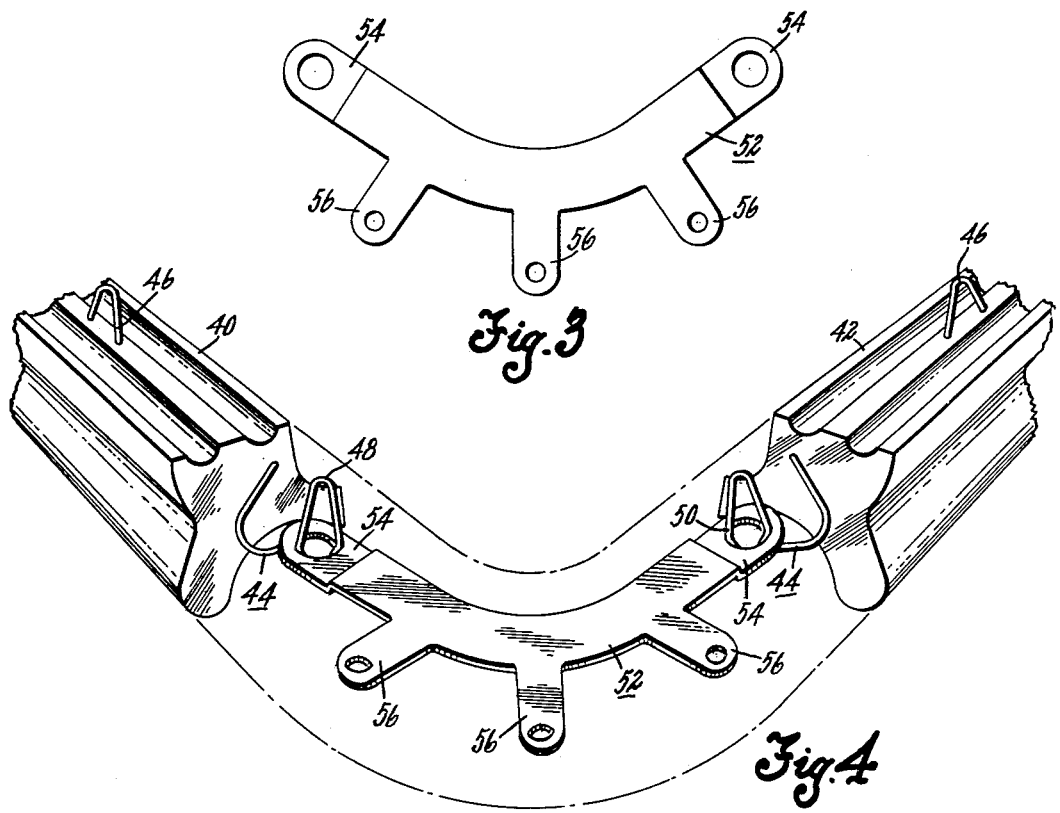

United States Patent Office 2,720,685
Patented Oct. 18, 1955

2,720,685
SEALING STRIP

Edward P. Harris, Dayton, Ohio, assignor to General Motors Corporation, Detroit, Mich., a corporation of Delaware Application August 26, 1954, Serial No. 452,293

8 Claims. (Cl. 20—69)

This invention relates to sealing strips and is particularly concerned with sealing strips having integrally associated attachment means molded therein.

The invention as disclosed herein is directed to sealing strips of the general type shown in Harris Patent No. 2,579,072 assigned to the assignee of this invention. This type of strip is preferably formed from a latex foam made from natural rubber latex, synthetic resin latex, mixtures thereof, etc., wherein the foam is compounded and cured in the desired cross sectional shape. A reinforcement is molded within the sealing strip which comprises a zig-zag wire which imparts extensibility to the reinforcement whereby the strip is more mobile for installation purposes. The wire includes spaced attachment clips integrally formed therewith, which clips protrude through the latex foam strip and are sufficiently resilient to be capable of being pressed into apertures whereby they function as snap fasteners for holding the strip in place.

In certain applications of this type of sealing strip it has been found that difficulties are experienced at the corner portions of a closure, for example, a door or a rear deck lid of an automotive vehicle. This difficulty is caused by the fact that the strip must be formed around the corners and in this position there is a tendency for the snap fasteners to become disengaged upon closure of the door or lid and in some cases where the corner is rather abrupt there are insufficient fastening means present for producing a satisfactory assembly.

For the reasons heretofore stated it has become increasingly desirable to produce a strip which has specific fastening means present which are positioned at the corner portions of the closure whereby the strip may be satisfactorily engaged to the door or lid at the corners thereof.

To this end I have provided a new combination comprising a sealing strip which embodies all of the desirable features of the standard sealing strip and which also includes means adjacent those portions of the strip which fit around corners for fastening the strip to the closure member.

It is therefore a main object of the invention to provide a sealing strip of the type heretofore described wherein portions of the strip which are normally positioned at the corners or ends of a closure member include a different type of fastening means which is associated with the remainder of the fastening means whereby the said corner portions may be satisfactorily secured to the closure member.

In carrying out the above object, it is another object to provide a wire reinforcement for the strip having fastening clips in two planes which are disposed approximately 90° apart to facilitate the attachment of the strip to a closure member.

A still further object of the invention is to provide a sealing strip assembly for a door or a similar type of closure member wherein molded corners are present which include arcuate reinforcing means therein which are associated with the wire reinforcement in the remainder of the strip and which include attachment tabs that extend outwardly from the strip and generally in a plane normal to the plane which includes the remainder of the fastening means.

Further objects and advantages of the present invention will be apparent from the following description, reference being had to the accompanying drawings, wherein preferred embodiments of the present invention are clearly shown.

In the drawings:

Fig. 3 is a plan view of another type of corner reinforcement;

Fig. 4 is a perspective view of the corner reinforcement shown in Fig. 3 in place prior to molding the corner onto the strip; and Fig. 5 is a fragmentary view in perspective including a reinforcement as shown in Fig. 3 in assembled position upon a closure member.

Figures 1, 2:
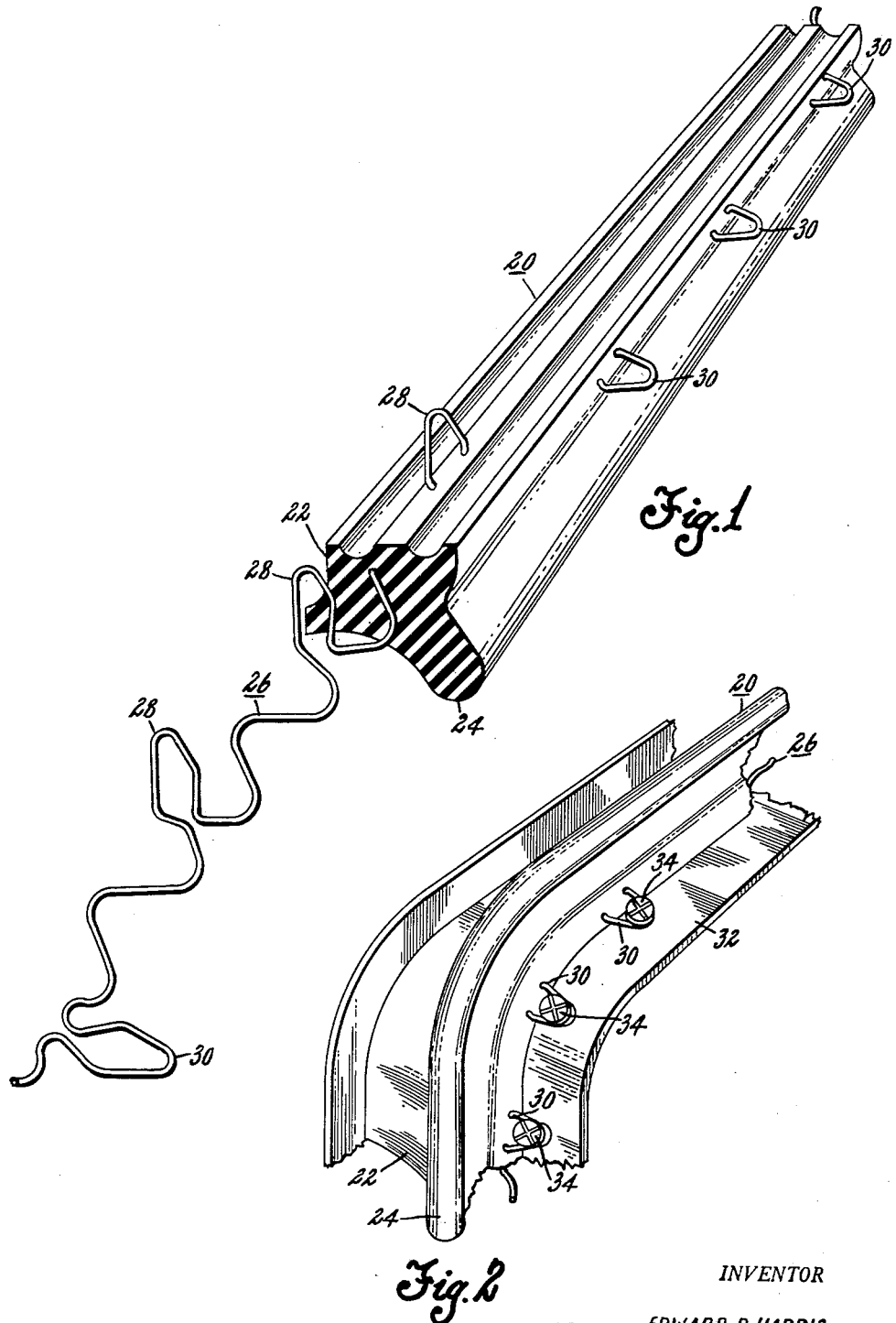
Fig. 1 is a view in perspective showing a portion of a sealing strip and showing an exposed portion of a reinforcing wire.
Fig. 2 is a fragmentary view in perspective showing the sealing strip attached at a corner portion of a closure member.

As explained hereinbefore, it is extremely desirable that sealing strips for automotive vehicles and similar applications be provided with means for attaching the strips in fixed relation to the closure member of door. Since the corner portions of the strip are the most difficult to secure, it is desirable to provide a different type of fastening means at these predetermined portions on the strip to facilitate assembly of the strip to the door. In Fig. 1 a sealing strip is shown at 20 which includes a body portion 22 and a sealing lip 24 integrally molded thereon. Molded within the sealing strip is a reinforcing wire 26 which is of a zig-zag nature to permit extensibility thereof whereby the strip is more or less mobile for mounting purposes.

Spaced along the wire 26 are a plurality of spring-like clip portions 28 which extend through the body portion of the strip in a plane substantially normal to the plane of the sealing lip 24. These spring-like clips 28 are adapted to be inserted in spaced apertures in the door or closure frame member and due to their springy nature may be pressed into the apertures to fasten the strip in place and in this instance they function in much the same manner as a snap fastener. In order to provide a more positive mounting means at the corner portions of the closure member the zig-zag wire 26 is also provided with spaced attachment clips 30 which are positioned in a plane at 90° to the plane of the clips 28. Thus, the clips 30 extend from the body portion 22 of the strip 20 at right angles to the clips 28. In Fig. 2 it will be seen that the clips 30 when the device is installed are substantially flush with mounting surface 32 of a door or closure member at a corner portion thereof. These clips may then be used to attach the strip to the door or closure through the use of screws, rivets or other suitable means 34 which provide a positive association of the strip and member at the corner portions. Around the remainder of the periphery of the member, that is to say, at the straight portions thereof, the attachment clips 28 are provided which merely snap into apertures along the member 32. Thus, it will be seen that in the normal application of my improved strip the corner portions of the strip are held securely against possible disassembly and even though the strip is stretched or compressed at the corner portions, the assembly thereof is fixed due to the use of the screws, rivets or other fixed fastening means.

Another embodiment of the invention is shown in Figs. 3 through 5. In this instance straight sections of sealing strips as described in copending Patent No. 2,579,072 are provided for the straight sections of the closure member. These are shown at 40 and 42. The sections 40 and 42 include the usual wire reinforcement 44 therein which has spaced attachment clips 46 extending therefrom which pass outwardly from the body portions of the strips 40 and 42 and which clips 46 are used in the conventional manner to snap through apertures provided in the frame of the closure member. At the ends of the strips 40 and 42 the wire reinforcement 44 is uncovered to expose clips 48 and 50. In order to join the strips 40 and 42 at the corners, a sheet metal member 52 is provided which has slightly depressed apertured end portions 54 and a plurality of ears 56 which are pierced at their outer extremities and which extend radially outwardly from the arcuate shaped member 52. In assembly, the ends of strips 40 and 42 are placed in a mold and the sheet metal member 52 is positioned with respect to the ends of the strips 40 and 42 by pressing the exposed clips 48 and 50 through the apertured end portions 54 in the arcuate sheet metal member 52. The mold is then closed and material to form a corner 53 is injected into place using the same elastomer used in the remainder of the strip. This injected corner bonds to the material on the strip 50 and 42 and likewise completely covers and envelops the sheet metal member 52 while the ears 56 extend from the body of the strip which at the corner is of the same cross section as the remainder thereof. The injection process is repeated for as many corners as are required whereby a strip assembly is formed which is predetermined to fit a specific closure member.

In attaching this strip to the door or closure member, the same procedure is followed as in connection with the embodiment as shown in Figs. 1 and 2, namely, the attachment clips 46 are pressed into apertures in the frame while the ears 56 are attached at the corner portions as shown in Fig. 5. This specific embodiment produces a very uniform seal which is free from any gapping at the corners and which is firmly affixed at all portions around the closure member. The use of the apertured ends 54 of the sheet metal member 52 in connection with the clips 48 and 50 maintain the unitary nature of the seal whereby the effectiveness of the zig-zag wire reinforcement is maintained in that no portion of the strip is disconnected from any other so far as the reinforcement is concerned.

It is preferable in most instances to depress the clips 48 and 50 so that they do not protrude from the strip after the corner is formed, although this is a matter of choice. It is also apparent that the apertured ends 54 of the sheet metal member 52 may be bent out of the main plane of the sheet metal member so that the ears are positioned in any desired spacing with respect to the base of the strip, all of these modifications being matters of choice and being dictated in most instances by the specific design of the closure member.

In any case, it is apparent that I have provided a new combination in a sealing strip wherein the heretofore difficult corner portions of a seal assembled to a door or closure are fixedly attached to the corner portions to prevent unintentional disassembly of the strip and possible injury thereof due to pinching in the door or closure member. In the present invention the corners are secured by screws, rivets or other suitable means while the remainder of the strip maintains its extensibility whereby self-adjustment of the strip through lateral adjustment of the attachment clips is maintained for satisfactory alignment thereof with the receiving apertures in the frame members.

The door strip assembly having formed corners as described in connection with Figs. 3 through 5 is obviously the ideal sealing strip for a given closure member since this strip is made to a predetermined shape and size and due to the preformed corner presents a smooth surface which provides the optimum in sealing effect with respect to the closure member.

While this disclosure has been directed to corners, it is understood that similar expedients may be used at the ends of strips where construction details require more secure fastening and thus the part 52 may be of some other shape if desired.

While the forms of embodiment of the invention as herein disclosed constitute preferred forms, it is to be understood that other forms might be adopted, as may come within the scope of the claims which follow.

What is claimed is as follows:

1. A resilient rubber-like sealing strip adapted to be attached to a member including a corner portion thereon comprising in combination; a resilient body portion, a sealing lip extending outwardly therefrom, an extensible wire reinforcement molded within said body portion, and a plurality of attachment clips associated with said reinforcement, a major portion of said clips extending outwardly of said body portion and a minor portion of said clips extending outwardly of said body portion in a plane at substantially right angles to the plane including the major portion of said clips said minor portion of said clips being used to attach said strip to said corner portion of the member while the major portion of said clips is used to attach the remainder of the strip to the member.

2. A resilient rubber-like sealing strip adapted to be attached to a member including a corner portion thereon comprising in combination; a resilient body portion, a sealing lip extending outwardly therefrom, an extensible wire reinforcement molded within said body portion, a plurality of integral attachment clips in spaced relation along said reinforcement wherein a predetermined number of successive clips extend outwardly of said body portion in one plane and a predetermined number of successive clips extend outwardly of said body portion in another plane positioned at substantially 90° from the first mentioned plane said second mentioned clips extending in a plane substantially 90° from said first mentioned clips being used to connect the strip to the corner portion of the member while the remainder of said clips is used to attach the remainder of the strip to the member.

3. A resilient rubber-like sealing strip comprising in combination; two similar resilient body portions, sealing lips extending outwardly therefrom, extensible wire reinforcements molded within said body portions and including a plurality of integral attachment clips associated therewith, a curved sheet metal corner joining said two body portions and molded in a corner position, said sheet metal member being attached to either end of said wire reinforcement, said sheet metal corner having attachment points extending therefrom outwardly of the body portion and generally at right angles to the other clips.

4. A sealing strip assembly for surrounding and sealing a closure for an opening in a panel, comprising; a resilient rubber-like seal strip including a sealing flange extending laterally therefrom throughout the length of the strip, said strip having a length substantially equal to the circumference of the opening to be closed, an extensible wire reinforcement molded in said strip, attachment clips associated with said wire reinforcement and extending outwardly from said strip and adapted to be used for attaching the strip to portions of the closure member along four sides of the opening, and four sections of the attachment clips associated with the first mentioned attachment clips, said last mentioned clips extending outwardly of said strip in a plane generally at right angles to the plane through the remainder of the clips, said four sections of clips being adapted for attachment around the corner portions of the closure.

5. The assembly as claimed in claim 4 wherein all of the clips extending along the sides of the strip and around the corners of the strip are formed from a continuous wire reinforcement.

6. An assembly as claimed in claim 4 wherein the clips along the sides of the opening are separate from the clips at the corner portions thereof and wherein the corner portions are arcuate sheet metal members.

7. A corner structure for joining two separated sections of sealing strip which includes attachment clips molded therein made from elastomeric materials comprising; an arcuate sheet metal plate having a plurality of outwardly extending attachment lugs thereon, said plate having opposed end apertures each adapted to fit over an attachment clip provided at the end of the two separated sections of sealing strip, and a molded covering for said plate having a similar cross section to the end portions of said strip and integrally bonded thereto.

8. A resilient rubber-like sealing strip comprising in combination; a resilient body portion, a sealing lip extending outwardly therefrom, an extensible wire reinforcement molded within said body portion and including a plurality of integral attachment clips associated therewith, a sheet metal member joined to said body portion by a molded covering, said sheet metal member being attached to the end of said wire reinforcement and having attachment points extending therefrom outwardly of the body portion and generally at right angles to the other clips.

References Cited in the file of this patent

UNITED STATES PATENTS 2,601,512    Gagnier      June 24, 1952

FOREIGN PATENTS 269,016    Switzerland      Oct. 2, 1950